(12) United States Patent  
Guo

(10) Patent No.: US 10,809,610 B1  
(45) Date of Patent: Oct. 20, 2020

(54) TWO-PIECE LCD PROJECTOR BASED ON SEMI-FIELD SEQUENCE DISPLAY MANNER

(71) Applicant: NANHUA INTELLIGENT PRECISION MACHINE (SHENZHEN) CO., LTD., Shenzhen (CN)

(72) Inventor: Hanwen Guo, Chengdu (CN)

( * ) Notice: Subject to any disclaimer, the term of this patent is extended or adjusted under 35 U.S.C. 154(b) by 0 days.

(21) Appl. No.: 16/689,087

(22) Filed: Nov. 20, 2019

(30) Foreign Application Priority Data

Jun. 6, 2019 (CN) .......................... 2019 1 0495714

(51) Int. Cl.
| | |
|---|---|
| *G03B 33/08* | (2006.01) |
| *G03B 21/00* | (2006.01) |
| *H04N 9/31* | (2006.01) |
| *G03B 21/20* | (2006.01) |

(52) U.S. Cl.
CPC ........... *G03B 33/08* (2013.01); *G03B 21/006* (2013.01); *G03B 21/2013* (2013.01); *G03B 21/2033* (2013.01); *H04N 9/3111* (2013.01); *H04N 9/3164* (2013.01)

(58) Field of Classification Search
CPC .. H04N 9/3105; H04N 13/363; H04N 5/7441; H04N 9/317; H04N 9/315; H04N 9/3111; H04N 9/3164; G02B 27/283; G02B 27/145; G02B 27/149; G02B 27/1046; G02B 27/1006; G03B 33/08; G03B 21/2033; G03B 21/006; G03B 21/2013
See application file for complete search history.

(56) References Cited

U.S. PATENT DOCUMENTS

| 6,388,718 | B1* | 5/2002 | Yoo | G02B 26/007 348/E5.141 |
|---|---|---|---|---|
| 2002/0089612 | A1 | 7/2002 | Okada et al. | |
| 2004/0080938 | A1* | 4/2004 | Holman | F21S 8/08 362/231 |
| 2004/0207823 | A1* | 10/2004 | Alasaarela | H04N 13/337 353/122 |
| 2006/0215129 | A1* | 9/2006 | Alasaarela | G02B 27/145 353/94 |
| 2009/0213333 | A1* | 8/2009 | Chen | G02B 27/283 353/20 |

(Continued)

FOREIGN PATENT DOCUMENTS

| CN | 201993570 A | 9/2011 |
|---|---|---|
| CN | 104821161 A | 8/2015 |

*Primary Examiner* — Huyen L Ngo  
(74) *Attorney, Agent, or Firm* — Erson IP (Nelson IP)

(57) ABSTRACT

The disclosure provides a two-piece LCD (liquid crystal display) projector based on a semi-field sequence display manner, including first and second black and white transmission type LCD light valve modules, wherein the first LCD light valve module alternatively displays red and blue field images, which are alternatively illuminated by a red light source and a blue right source, of input video signals; the alternative lightening and extinguishing period of the red light source and the blue right source is synchronous with the alternative field of the red and blue field of this LCD light valve; the second LCD light valve module is used to display the green field image, which is constantly illuminated by the green light source, of the input video signal; the light passing through the first and second LCD light valve modules are converged by a light converging device.

5 Claims, 1 Drawing Sheet

(56) References Cited

U.S. PATENT DOCUMENTS

2010/0214497 A1  8/2010  Fujisaki et al.
2011/0141249 A1* 6/2011  Jan .................... H04N 13/363
                                                348/58

* cited by examiner

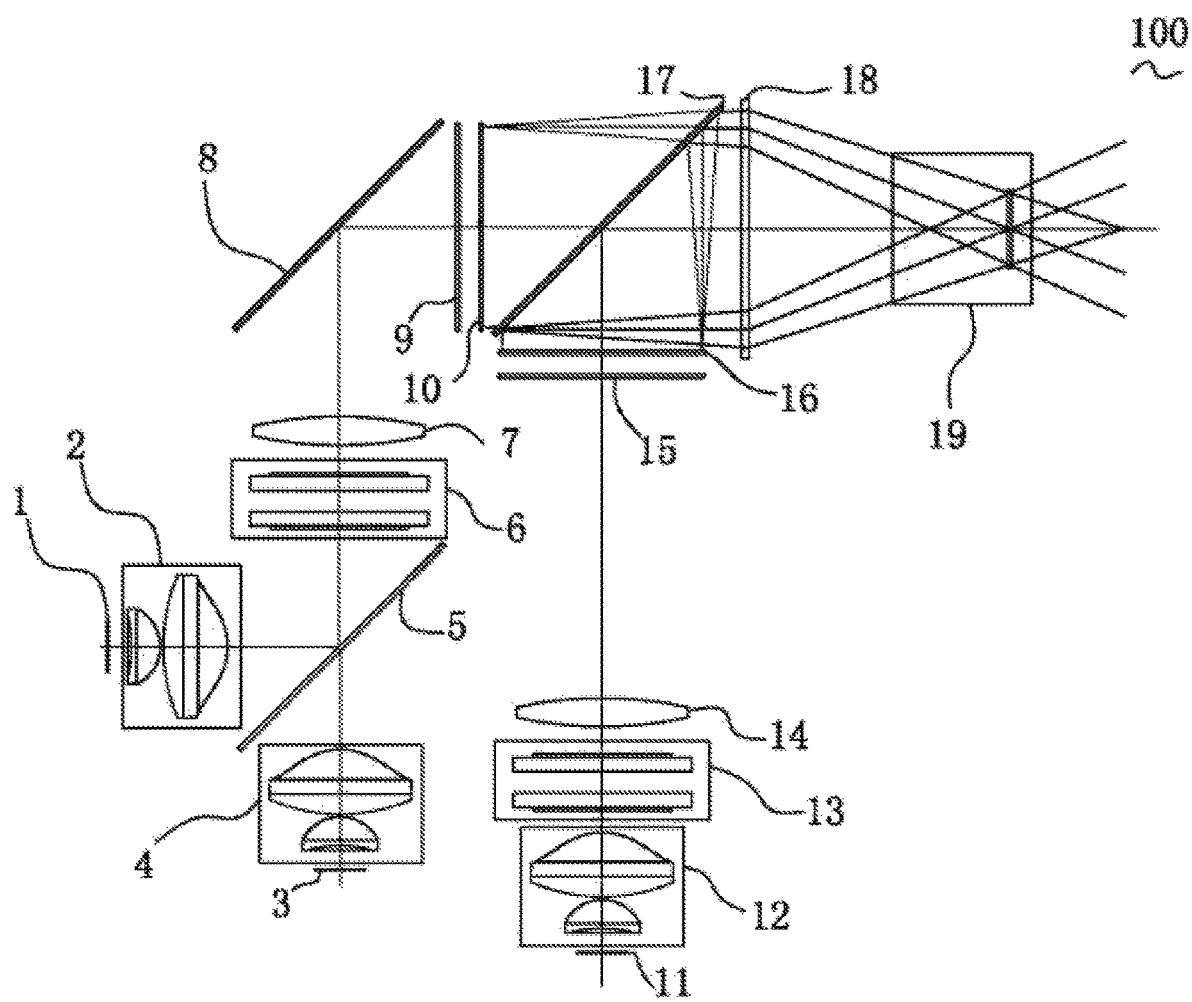

TWO-PIECE LCD PROJECTOR BASED ON SEMI-FIELD SEQUENCE DISPLAY MANNER

CROSS-REFERENCE TO RELATED APPLICATIONS

This application claims priority to Chinese Patent Application No. 201910495714.7 with a filing date of Jun. 6, 2019. The content of the aforementioned applications, including any intervening amendments thereto, are incorporated herein by reference.

TECHNICAL FIELD

The disclosure relates to a two-piece LCD (liquid crystal display) projector.

BACKGROUND OF THE PRESENT INVENTION

For a long time, people habitually classify projectors based on characteristics of a light valve, one of the most core devices of the projector in general, such as a DLP (digital light processing) projector, an LCD (liquid crystal display) projector, an LCOS (liquid crystal on silicon) projector, which are common at present.

The common LCD projectors refer to having two characteristics: the light valve adopts an LCD technology (for distinguishing DLP) and is of a transmission type (for distinguishing LCOS). The LCD projector generally has two principles and structure forms of a single LCD projector and a 3LCD projector. The general single LCD projector reproduces space color images under the irradiation of a white light source or an equivalent white light source by using a full-color LCD light valve. The general 3LCD projector uses three single-color (black and white) LCD light valves, that is, there is no CF (color filter) device used by the single LCD projector light valve on the LCD light valve, three paths of LCD light valves are illuminated by red, green and blue three primary lights, three LCD light valves each display a pure primary color field image, and finally the three primary color images generated by the three light valves are coincided, so as to generate the space color image just like the single LCD projector applying the full-color LCD light valve.

The single LCD projector is low in cost and simple in production, has stable and flicker-free images and brightness ranging from more than ten lumens to three or four hundred lumens, and has large competitiveness in the consume digital market due to extremely low price; the 3 LCD projector has rich color, good picture quality and high brightness and stable and flicker-free images, but has cumbersome production, high access threshold, high cost and brightness ranging from 800 to 8000 lumens, and is a main product in the traditional commercial and educational projector market.

The DLP projector performs display based on pure field sequence of time (except three-piece DLP projector), R, G and B field images of the input video signals are alternatively displayed, and a colorful color is synthesized in human brain through persistence of vision. However, because its core device is supplied only by TI (Texas Instrument) company, and it is cumbersome in production and high in access threshold, cost is high. With the use of LED light source, its defect of poor restore color has been improved well. However, because the DLP projector displays R, G and B field images in a pure field sequence, the viewing fatigue caused by image flicker has always been an important factor affecting user experience.

Looking at the projection product market in recent years, there are mainly products having principles of 3LCD projectors, single LCD projectors and DIP projectors described above.

The biggest disadvantage of the single LCD projector is that the "energy conversion efficiency" $\eta$ is too low. Generally, $\eta$ is defined as: $\eta$=[output brightness (Lm)/input electric power (w)/100 (Lm/w)*100%], in which the LED light efficiency is calculated according to the typical value 100 Lm of the high-power LED module, and such $\eta$ is only about 2%-3.5% in general, while the $\eta$ of 3LCD and DLP projectors using a UHP bulb, LED, laser and other light sources can easily reach 10% or even more than 25% in general.

The main reason for the low $\eta$ of the single LCD projector is that the efficiency of the light valve module is too low, and is generally only about 4%~7% which is determined by the polarizer, color film, TFT (thin film transistor) opening rate and the like. The efficiency of the polarizer is about 35%~40%, the efficiency of CF is about 5%~21%, and the TFT opening rate is about 50%~70%. However, the dark areas of CF and TFT opening rate (such as black frame) are overlapped to a certain extent, and therefore the total efficiency of LCD module cannot be obtained by directly multiplying the above data. The lowest-efficiency part among these factors is CF. Even though it is considered that lights are not shielded to be fully emitted without considering the opening rate, RGB cutoff wavelengths are not crossed and color gamut basically meets watching conditions, its theoretical efficiency limit is only 33.3%. If the RGB color purity (wavelength bandwidth of RGB tricolor CF) is to be properly pursued, its efficiency can only be reduced and cannot be increased. If the contrast (blackbox and other shading measures) factors, as well as the alignment process difficulty of CF window and TFT window, and the yield of the process are to be considered, its efficiency will be further reduced, so trying to find a way to remove the CF device on the LCD light valve is the most critical factor to improve the $\eta$ of the single LCD projector.

To remove the CF and display the color image, three LCD light valves need to be used like the 3lcd projector, or enough fast response speed needs to display the three primary color field sequence like the DLP projector. Obviously, both of these two methods are not easy to implement. The 3LCD technology has high cost, is difficult to manufacture, and has many industrial chain constraints. However, for pure field sequence display, the practicability and production of the LCD light valves based on the current amorphous silicon and low-temperature polycrystalline silicon technology combined with actual demand indexes such as resolution and contrast are difficult in terms of refreshing speed; first, achievement of the requirement of the lowest refreshing rate 150 Hz of the single-piece pure field sequence display manner is basically impossible; second, even if the refresh rate reaches 480 HZ (special high-temperature polycrystalline silicon LCD light valve test), the image will produce serious tailing and display confusion. Bad phenomena such as tailing (i.e. when the LCD light valve is tailing and display confusion, turn off the light source) are avoided to be seen by controlling the lighting and extinguishing of the light source, so the duty cycle of the light source is inevitably and significantly reduced, resulting in a significant reduction in the output brightness of the light source, thus the original intention of removing the CF and greatly improving the brightness and energy utilization is lost.

SUMMARY OF PRESENT INVENTION

The technical problem to be solved by the disclosure is to provide a two-piece LCD projector and a projection method aiming at the above defects of the prior art, to achieve low manufactory threshold, high cost performance, high energy conversion efficiency, slight watching fatigue feeling and extremely high brightness output.

The disclosure provides a two-piece LCD projector based on a semi-field sequence display manner, including a red LED light source, a spotlighting device, a blue LED light source, a spotlighting device, a red and blue light converging device, a red and blue channel light integrating device, an overlapped lens, a holophote, a focusing lens, a first LCD light valve module, a green LED light source, spotlighting device, a green channel light integrating device, an overlapped lens, a focusing lens, a second LCD light valve module, a red, green and blue light converging device, a field lens and a projection lens, wherein the first the first LCD light valve module alternatively displays red and blue field images, which are alternatively illuminated by the red light source and the blue right source, of input video signals; the alternative lightening and extinguishing period of the red light source and the blue right source is synchronous with the alternative field of the red and blue field of this LCD light valve; the second LCD light valve module displays the green field image, which is constantly illuminated by the green light source, of the input video signal; the light passing through the first LCD light valve module and the second LCD light valve module are converged by the light converging device, and the image displayed by the two light valve module and the second light valve module is finally projected on a curtain via the field lens and the projection lens. The two-piece LCD projector provided by the disclosure has the characteristics of low manufactory threshold, high cost performance, high energy conversion efficiency, slight watching fatigue feeling, extremely high brightness output and the like.

In some embodiments, the lightening starting points of the red light source and the blue light source lag behind the starting points displayed by corresponding red and blue color field display of the LCD light valves of the field sequence display for a certain time; and the extinguishing points of the red light source and the blue light source are ahead of the stop points of corresponding red and blue color field display of the LCD light valves of the field sequence display for a certain time.

In some embodiments, the first LCD light valve module and the second LCD light valve module have the same size and total pixel quantity, refresh rate is ≥80 Hz, and the modules have no CF devices.

In some embodiments, the red, green and blue light converging device selects a dichroic glass plate, a PBS film or a PBS prism.

In some embodiments, the red, green and blue light converging device selects the dichroic glass plate the dichroic glass plate whose break point wavelength selects ≤475 nm and ≥595 nm for light transmission, and 465-595 nm for light reflection.

The disclosure has the beneficial effects that compared with the existing LCD projector, the two-piece LCD projector based on the semi-field sequence display manner provided by the disclosure has improved energy conversion efficiency, but retains the characteristics of simple structure and low cost of the single LCD projector, compared with the existing 3LCD projector, the two-piece LCD projector based on the semi-field sequence display manner provided by the disclosure is simple in fabrication and low in cost, but has the characteristics of high energy conversion efficiency of the 3LCD projector, compared with the existing DLP projector, besides high energy conversion efficiency, watching fatigue feeling of the two-piece LCD projector based on the semi-field sequence display manner provided by the disclosure is much slighter than that of DLP projector in which red, green and blue lights are all alternated because of semi-field sequence display (only red and blue color field images are alternated, and green color field is constantly bright and not alternated); since the RGB three-color lights emitted from the LCD light valve can be converged in a low manner, the size of the light valve has tiny effect on cost and performance of the red, green and blue light converging device, and therefore the sizes of the two LCD light valve modules can be large, such as up to more than 4-5 inches, so Etendue of the light valve is large, the light source having larger lightening area performance illumination. Since the output luminous flux of the LED light source is in direct proportion to the lightening area, the projector can output extremely high brightness.

DESCRIPTION OF THE DRAWINGS

The disclosure will be further described in combination with the drawings and embodiments. In the drawing:

FIG. 1 shows a principle structure of a two-piece LCD projector based on the semi-field sequence display manner according to the disclosure.

DETAILED DESCRIPTION OF PREFERRED EMBODIMENTS

Preferred embodiments will be described in detail in combination with drawings.

Referring to FIG. 1, FIG. 1 shows a principle structure of a two-piece LCD projector based on the semi-field sequence display manner according to the disclosure. The two-piece LCD projector 100 includes a red LED light source 1, a spotlighting device 2, a blue LED light source 3, a spotlighting device 4, a red and blue light converging device 5, a red and blue channel light integrating device 6, an overlapped lens 7, a holophote 8, a focusing lens 9, a first LCD light valve module 10, a green LED light source 11, spotlighting device 12, a green channel light integrating device 13, an overlapped lens 14, a focusing lens 15, a second LCD light valve module 16, a red, green and blue light converging device 17, a field lens 18 and a projection lens 19.

The basic operating principle of the two-piece LCD projector is as follows: after the LED light sources 1 and 3 of red and blue channels are condensed by their respective spotlighting devices 2 and 4, the condensed LED light sources are converged by the red and blue light converging device 5 to irradiate on the light integrating device 6, and the uniform illumination of the first LCD light valve module is achieved by the light integrating device 6, the overlapped lens 7, the holophote 8 and the focusing lens 9. The first LCD light valve module 10 alternately displays the red and blue color field images of the input video signals, and the red LED light source 1 and blue LED light source 3 perform alternative illumination; the alternating period of the red LED light source 1 and the blue LED light source 3 is synchronous with the alternating field sequence of the red and blue color field images of the first LCD light valve module 10; similarly, the second LCD light valve module 16 displays the green color field image, which is illuminated by the green LED light source 11, of the input video signal; the lights passing through the first and second LCD light valve modules 10 and 16 are converged by the red, green and blue light converging device 17, and then project the images displayed by the first and second LCD light valve modules 10 and 16 on the curtain via the field lens 18 and the projection lens 19. The red and blue color field images of the field sequence generated by the first LCD light valve module 10 are superposed with the green color field images generated by the second LCD light valve module 16 by using the visual residual effect of the human eye, so that the RGB colors finally overlap in time and space, and the full color image is generated in the human brain.

The realization of human brain's full color image perception by field sequence display is substantively based on the visual residual effect of human eyes. However, the disclosure is different from the general full-color field sequence display technology completely depending on pure time (such as a single-chip DLP projector, some special single-chip field sequence LCD projectors, single field sequence LCOS projectors) in that first, the two-piece LCD projector based on the semi-field sequence display manner provided by the disclosure is a half field sequence display, that is, except for the free duty cycle of red and blue light sources, there are two primary color outputs (R and G, G and B) at any time, instead of the pure field sequence display mode that there is only one primary color field output at any time; second, one primary color is constantly bright and does not involve sequence alternation, and is pure space display; third, two fields perform field sequence display based o time and pure time display, so the two-piece LCD projector is a composite display of time and space; fourth, the green color field image in which the output brightness of the projector is dominate and which has the highest human eye perception (near 555 nm), is displayed by the green light source 11 and the second LCD light valve 16 in a constant brightness manner without no flicker. Therefore, the image flicker produced by the first LCD light valve 10 due to the alternation of red and blue color fields greatly reduces the visual fatigue of the human eye when watching (the light near 450 nm and 630 nm is not sensitive than the light near 555 nm); fifth, only two primary color images involve field sequence alternation, which has slowed flicker index level and reduced refresh rate of the light valve in double, as compared with the field sequence alternation in which all the three primary colors involve.

Under the condition of ensuring the projection picture is in white balance, the light sources 1, 3 and 11 use R, G and B-based color LED light sources, in which the green LED light source 11 is constant to illuminate the second LCD light valve module 16; the red LED light source 1 and the blue LED light source 3 perform alternating lighting according to a certain duty cycle and time sequence, because the field sequence with the first LCD light valve module 10 is synchronous, and the lighting between the two light sources is interval, lighting starting and stopping are every crucial, reasonable duty cycle ratio is needed, and the images are avoided to be tailed.

The spotlighting devices 2, 4 and 12 typically adopt lens groups, the solid angles of the output beams thereof is determined according to the design characteristics of the optical integrating devices 6 and 13. Generally, the optical integrating device can obtain higher efficiency within 12° of the single side solid angle of the output beam of the spotlighting device. However, considering the overall efficiency, color uniformity and other factors, the single side value of the solid angle of the beam is preferably ≤7°, and the volume of the whole optical system from the light source to the lens is increased appropriately.

The red and blue light converging device 5 is a dichroic glass plate made by vacuum coating. There is almost no requirement for wavelength division. It can be used at any point within 500 nm~560 nm.

In principle, the light integrating devices 6 and 13 preferably select the relatively cheap resin compound eye lens, or use an integral rod (solid or hollow), but whether it is the compound eye lens or the integral rod, a PCS (polarization conversion system) device can be added to improve the utilization of light. The improvement of the utilization of light after adding PCS device is determined by many factors, such as Beam solid angle size, lens Fno (aperture number) limit and PCS self efficiency.

The overlapped lenses 7 and 14 overlap the light produced by several sub light source images output by the light integrating devices 6 and 13.

The focusing lenses 9 and 15 focus the image of the sub light source generated by the light integrating devices 6 and 13 on the windows of modules 10 and 16 on the first and second LCD light valves with high efficiency and low distortion, so as to realize the uniform illumination of the first and second LCD light valve modules 10 and 16.

The first and second LCD light valve modules 10 and 16 are two black-and-white LCD screens with the same size and pixel number without CF devices. If the application of the disclosure is intended to obtain higher output brightness, the polarizers (generally absorption type) on the incident and outgoing sides of the two LCD light valve modules 10 and 16 are not suitably directly attached to the incident and outgoing glass surfaces of the two LCD light valve modules 10 and 16, they need to be separated out and pasted at both sides of LCD light valve module 10 and 16 respectively on a separate glass substrate, and efficient air cooling and other measures are needed for heat dissipation. In front (close to LED light source direction) of the polarizers at the incident and outgoing sides of the two LCD light valve modules 10 and 16, a reflective polarize needs to be arranged in regardless of the illuminating system being provided with the PCS device to protect the safety of the absorption polarizer to the greatest extent.

For the red, green blue light converging device 17 selects the dichroic glass plate and other devices which have wavelength or vibration axis phase segmentation characteristics, and it is better to set the solid angle of the light within 45±7° on one side during the implementation. The segmentation wavelength of the red, green and blue light converging lens 17 is ≤475 nm and ≥595 nm for light transmission, and 465-595 nm for light reflection. However, such wavelength segmentation points are not completely necessary, depending on the specific situation, such as the characteristics of the light source, color coordinates, color gamut, efficiency and other requirements.

The red, green and blue light converging device 17 can also be PBS (polarization beam splitter) film attached to the green plate or white plate glass to achieve light converge, but there are requirements for the polarization phase (axis) of the polarized light emitted by the first and second LCD light valve modules 10 and 16, that is, the polarized lights emitted by the two LCD light valve modules 10 and 16 are required to be orthogonal; it can also be PBS prism and other ways of light converge, especially in the case of extremely high brightness output, such as projector output of more than 6000 lumens, PBS prism has better durability and thermal stability.

The specific type selection of the red, green and blue light converging device 17 is comprehensively evaluated mainly depending on the allowable cost performance ratio of the projector, i.e. cost, output brightness level, image quality demand, and some specific engineering factors.

The field lens 18 is a part of the projection lens in the optical system per se. However, when the size of the LCD light valve module is large (such as 3-5 inches), the field lens 18 and the projection lens 19 are not suitably manufactured together because of cost, and the field lens 18 often uses cheap plastic Fresnel lens to obtain a simpler lens design than the field lens using glass lens.

The projection lens 19 can be a single LCD projector lens with the same light valve window and resolution. The design of the disclosure is that the Fno of the projection lens 19 is not additionally affected when the PCS device is not set on the lighting system. If the PCS device needs to be added, it depends on whether the Fno of the lens is allowed and how much Fno value needs to be reduced. Balance evaluation is performed between reduction of the luminous area of the LED light source and addition of the PCS device It should be understood that the above embodiments are only for explaining the technical solution of the disclosure but not limiting thereto. For those skilled in the art, the technical solution described in the above embodiments can be modified, or some of the technical features can be replaced equivalently; and these modifications and replacements shall belong to the scope of protection of the appended claims of the disclosure.

I claim:

1. An two-piece Liquid Crystal Display (LCD), projector based on a semi-field sequence display manner, comprising a red Light Emitting Diode (LED) light source (1), a spotlighting device (2), a blue LED light source (3), a spotlighting device (4), a red and blue light converging device (5), a red and blue channel light integrating device (6), an overlapped lens (7), a holophote (8), a focusing lens (9), a first LCD light valve module (10), a green LED light source (11), spotlighting device (12), a green channel light integrating device (13), an overlapped lens (14), a focusing lens (15), a second LCD light valve module (16), a red, green and blue light converging device (17), a field lens (18) and a projection lens (19), wherein the first LCD light valve module alternatively displays red and blue field images, which are alternatively illuminated by the red light source (1) and the blue right source (3), of input video signals; the alternative lightening and extinguishing period of the red light source (1) and the blue right source (3) is synchronous with the alternative field of the red and blue field of this LCD light valve (10); the second LCD light valve module (16) displays the green field image, which is constantly illuminated by the green light source (11), of the input video signal; the light passing through the first LCD light valve module (10) and the second LCD light valve module (16) are converged by the light converging device (17), and the image displayed by the first light valve module (10) and the second light valve module (16) is finally projected on a curtain via the field lens (18) and the projection lens (19).

2. The two-piece LCD projector according to claim 1, wherein the alternative lightening starting points of the red light source (1) and the blue light source (3) lag behind the starting points of corresponding red and blue color field display of the first LCD light valve module (10) for a certain time; the alternative extinguishing points of the red light source (1) and the blue light source (3) are ahead of the stop points displayed by corresponding red and blue color fields of the first LCD light valve module (10).

3. The two-piece LCD projector according to claim 1, wherein the first LCD light valve module (10) and the second LCD light valve module (16) have the same size and total pixel quantity, refresh rate is ≥80 Hz, and the modules have no Color Filter (CF) devices.

4. The two-piece LCD projector according to claim 1, wherein the red, green and blue light converging device (17) selects a dichroic glass plate, a PBS film or a PBS prism.

5. The two-piece LCD projector according to claim 1, wherein the red, green and blue light converging device (17) selects the dichroic glass plate whose break point wavelength selects ≤475 nm and ≥595 nm for light transmission, and 465-595 nm for light reflection.

* * * * *